United States Patent [19]

Dwyer et al.

[11] Patent Number: 4,657,191
[45] Date of Patent: Apr. 14, 1987

[54] BALE HANDLING AND SHREDDING APPARATUS

[76] Inventors: Paul Dwyer; Mark A. Dwyer, both of R.F.D., Bartlett, Nebr. 68622

[21] Appl. No.: 350,636

[22] Filed: Feb. 22, 1982

[51] Int. Cl.$^4$ .......................................... B02C 13/286
[52] U.S. Cl. ............................. 241/101.7; 241/101 A; 241/282
[58] Field of Search ............ 241/101.7, 101 A, 285 R, 241/285 B, 235, 282

[56] References Cited

U.S. PATENT DOCUMENTS

| | | | |
|---|---|---|---|
| 2,883,030 | 4/1959 | Saunders | 198/318 |
| 3,209,932 | 10/1965 | Schiltz . | |
| 3,298,550 | 1/1967 | Schiltz . | |
| 3,341,039 | 9/1967 | Cranage | 198/318 |
| 4,019,644 | 4/1977 | Seymour | 198/318 |
| 4,044,906 | 8/1977 | Schrag | 198/31.8 |
| 4,068,804 | 1/1978 | Butler et al. | 241/101.7 |
| 4,101,081 | 7/1978 | Ritter | 414/528 |
| 4,187,990 | 2/1980 | Lundahl et al. | 241/101.7 X |
| 4,248,561 | 2/1981 | Graves | 414/491 |
| 4,367,855 | 1/1983 | VonDerHeide | 241/101.7 X |
| 4,376,607 | 3/1983 | Gibson | 241/101.7 X |

Primary Examiner—Mark Rosenbaum
Attorney, Agent, or Firm—Zarley, McKee, Thomte Voorhees & Sease

[57] ABSTRACT

A bale handling and shredding apparatus is described including an elongated conveyor pivotally mounted on a wheeled frame such as a trailer or the like adapted to be pulled by a prime mover. The conveyor comprises a pair of elongated conveyor members which are pivotally mounted on the frame so that the rearward end of the conveyor may be positioned adjacent the ground to enable a plurality of bales to be conveyed forwardly on the conveyor. A bale shredding apparatus is pivotally mounted at the forward end of the frame at one side of the conveyor. A push arm assembly is mounted on the bale shredding apparatus and is adapted to push the forwardmost bale on the conveyor laterally into the bale shredding apparatus. The bale shredding apparatus shreds the bale and deposits the shredded hay or the like at one side of the trailer as the trailer is being moved through the field or feedlot.

4 Claims, 6 Drawing Figures

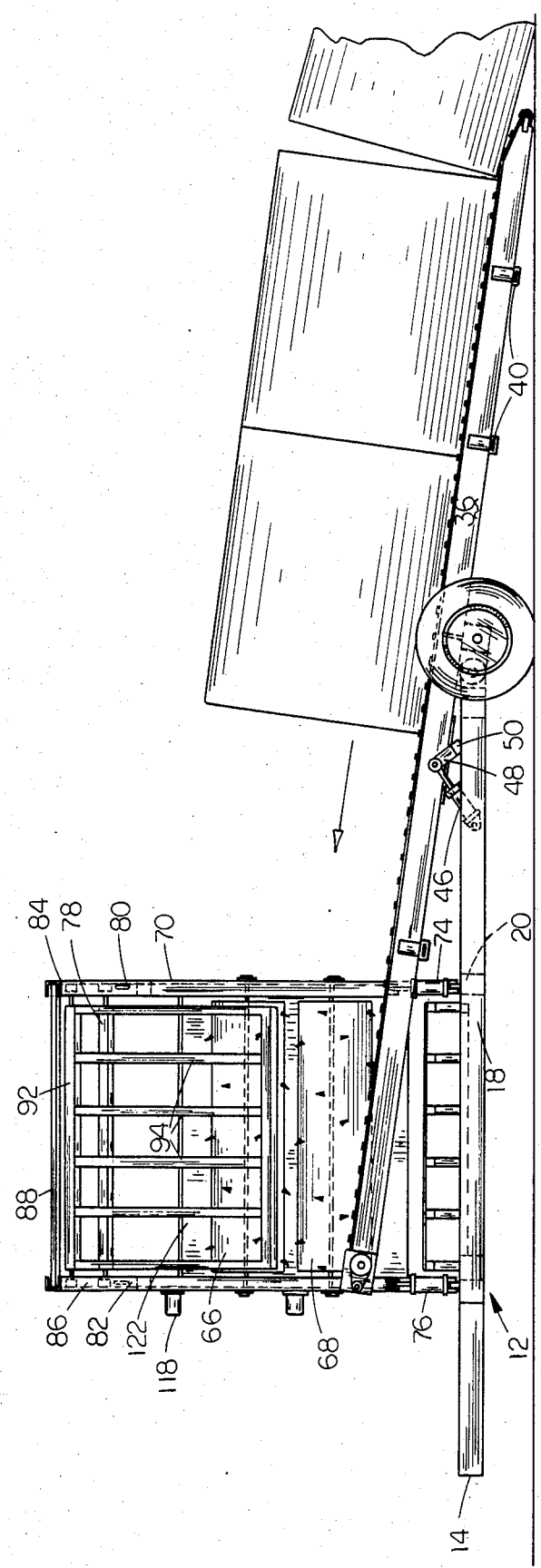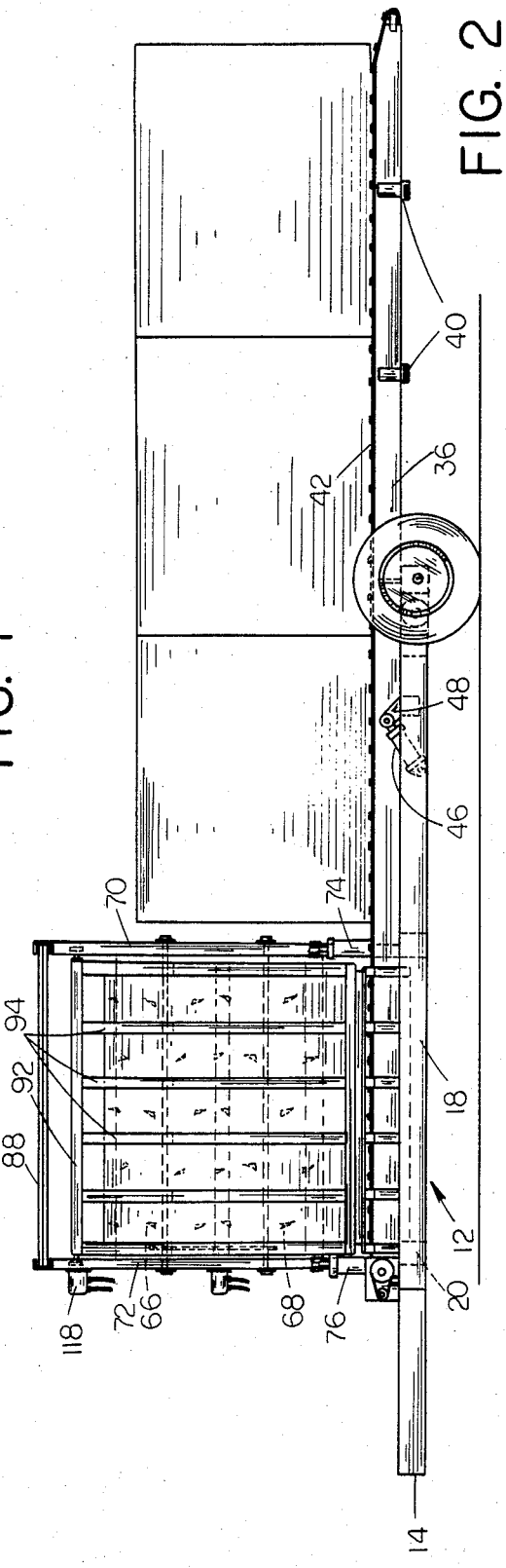

4,657,191

BALE HANDLING AND SHREDDING APPARATUS

BACKGROUND OF THE INVENTION

Hay, straw and cornstalks or the like are frequently baled in large cylindrical bales weighing as much as two thousand pounds. The large bales have definite advantages over the smaller rectangular bales but the handling and feeding of the same presents several problems.

Normally, the bales are placed upon the ground in an end-to-end relationship some distance from the area where the hay is going to be fed to livestock. When it is desired to feed the hay to the livestock, some type of bale carrier is employed to bring a single bale from the storage area to the feeding area. If a bale shredding apparatus is not available, the feeder normally attempts to unroll the hay but the same is an extremely difficult task. Apparatuses have been provided to chop or shred the hay but the same are not generally convenient to use. One type of hay shredder or processor is sold under the trademark HAYBUSTER and requires that the bale be lifted by means of a tractor loader or the like upwardly from the ground and lowered into the hopper of the machine. Other types of bale shredders have been provided but those devices are believed to shred the bale from one end thereof. Attempting to shred the bale from the end is an almost impossible task due to the wrapped configuration of the hay within the bale.

Therefore, it is a principal object of the invention to provide an improved bale handling and shredding apparatus.

A further object of the invention is to provide a bale handling and shredding apparatus wherein a plurality of cylindrical bales may be lowered or positioned upon the conveyor of the apparatus.

A further object of the invention is to provide a bale handling and shredding apparatus including means for shredding the bales from the side thereof.

A further object of the invention is to provide a bale handling and shredding apparatus including means for accommodating the large cylindrical bales while still having a width which is narrow enough to permit the apparatus to be moved on roads and highways.

A futher object of the invention is to provide a bale handling and shredding apparatus which is convenient to use.

These and other objects will be apparent to those skilled in the art.

BRIEF DESCRIPTION OF THE DRAWINGS

FIG. 1 is a side view of the apparatus of this invention illustrating the conveyor in an inclined and loading position:

FIG. 2 is a view similar to FIG. 1 except that the conveyor has been pivotally moved to its horizontal position:

SUMMARY OF THE INVENTION

Figure 3:
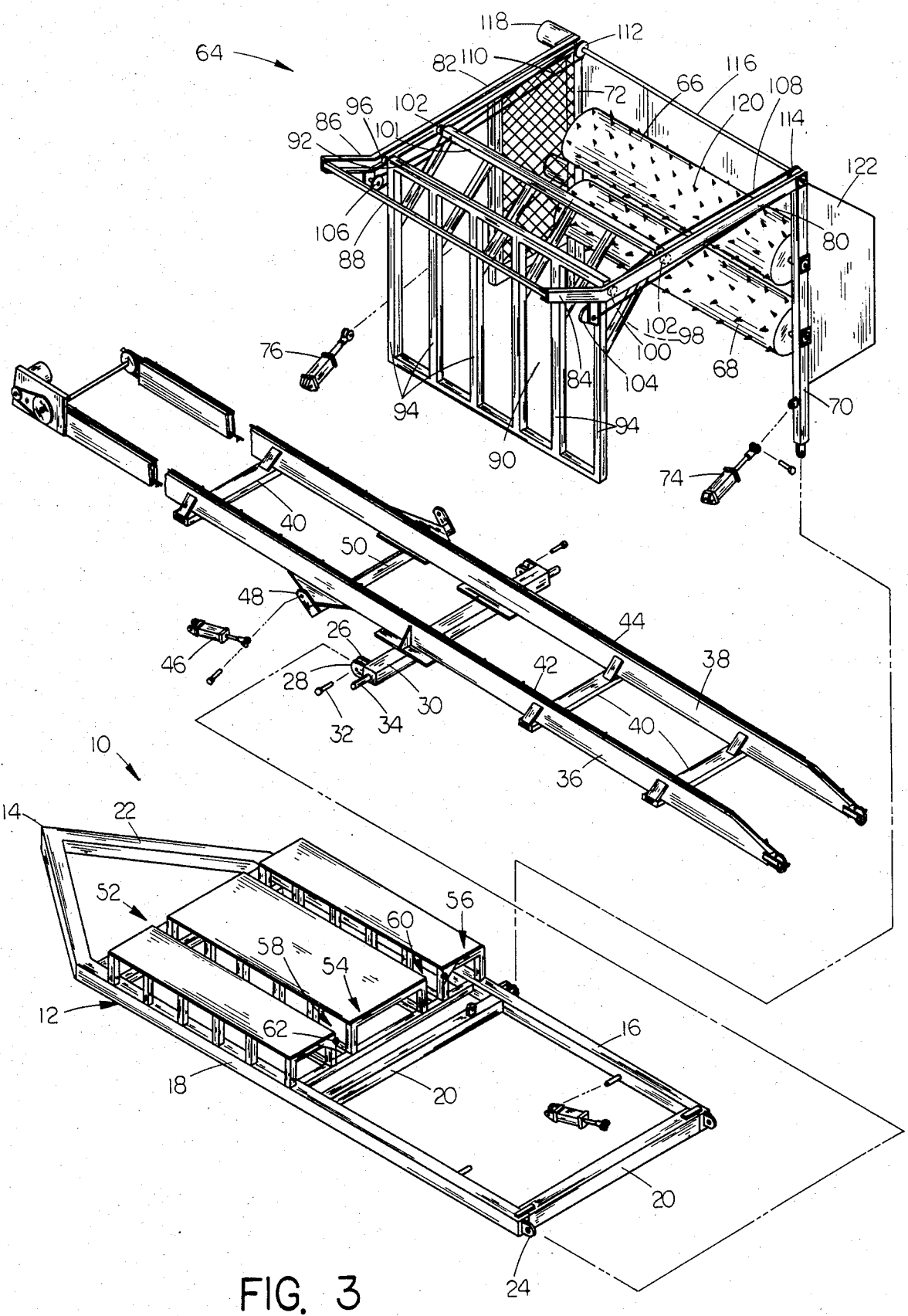
FIG. 3 is an exploded perspective view of the apparatus of this invention.
Figure 4:
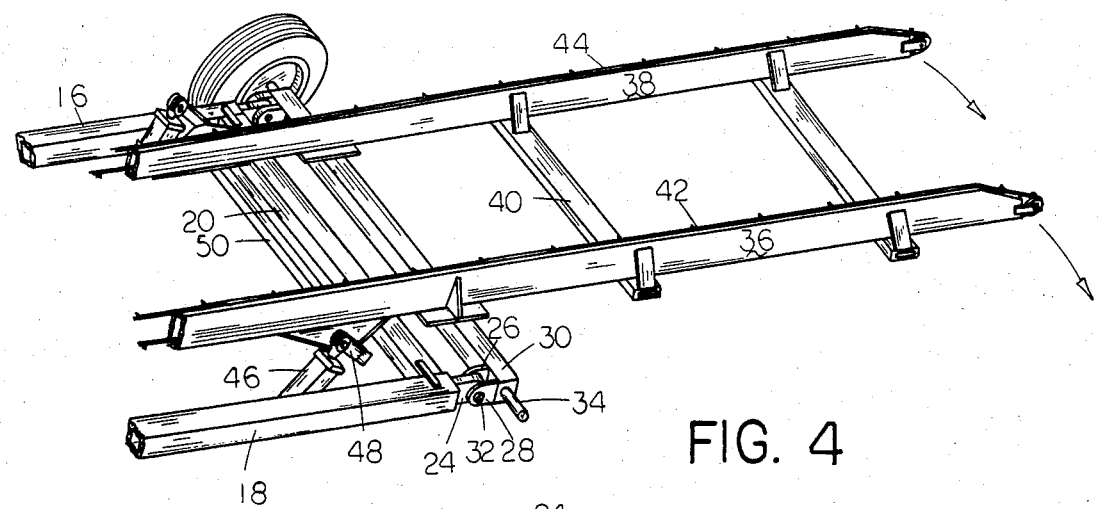
FIG. 4 is a partial perspective view of the rearward end of the apparatus.

A wheeled frame means such as a trailer or the like is provided and has an elongated conveyor means pivotally mounted thereon in such a manner to permit the rearward end of the conveyor to be positioned closely adjacent the ground. With the rearward end of the conveyor positioned adjacent the ground, the wheeled frame means is moved rearwardly simultaneously with operating the conveyor so that a plurality of cylindrical bales are loaded upon the conveyor means and moved forwardly thereon. When a plurality of bales have been loaded upon the conveyor, the conveyor is pivotally moved to a substantially horizontally disposed position. A hay shredder assembly is pivotally mounted at the forward end of the frame means at one side thereof and is adapted to shred the bales upon a push arm assembly mounted thereon pushing the forwardmost bales to the rotating shredding drums. The shredded hay is deposited adjacent one side of the trailer as the trailer is moved through the feeding area.

DESCRIPTION OF THE PREFERRED EMBODIMENT

The hay shredder 10 generally includes a wheeled frame means 12 having a suitable hitch at the forward end 14 to enable the frame means to be pulled behind a prime mover such as a tractor or the like. Frame means 12 includes a pair of longitudinally extending frame members 16 and 18 having a plurality of braces 20 secured thereto and extending therebetween. A V-shaped frame portion 22 extends forwardly from the frame members 16 and 18 in a converging fashion as illustrated in the drawings. The rearward ends of the frame members 16 and 18 are provided with rearwardly extending brackets 24 having openings formed therein which are adapted to be received between a pair of forwardly extending plates 26 and 28 provided on the forward end of the transversely extending axle 30. A hinge pin 32 pivotally connects the bracket 24 to the plates 26 and 28 to allow the pivotal movement therebetween.

The opposite ends of the axle 30 are provided with conventional spindles to enable wheels 34 to be mounted thereon in conventional fashion.

The numerals 36 and 38 refer to laterally spaced conveyor beams having transversely extending braces 40 extending therebetween. Conveyor chains 42 and 44 are suitably mounted on the beams 36 and 38 respectively and are selectively driven by a reversible hydraulic motor (not shown) to enable the bales to be moved either forwardly or rearwardly along the upper portion of the beams 36 and 38. Beams 36 and 38 are welded at their lower ends to the axle 30 for pivotal movement therewith.

A hydraulic cylinder 46 is pivotally connected at its base end to frame member 18 and has its rod end pivotally connected to bracket 48 which is welded to laterally extending cross brace 50 which is welded to the undersides of beams 36 and 38. Actuation of the hydraulic cylinder 46 causes beams 36 and 38 to be either moved to the inclined position for bale loading purposes or to the horizontal position as will be described in more detail hereinafter. Actuation of the hydraulic cylinder 46 causes the axle 30 to pivot relative to the frame members 16 and 18 about the hinge pins 32.

Platform portions 52, 54 and 56 are provided at the forward end of the frame means and have upper end portions which are positioned above the upper ends of the teeth on the conveyor chains 42 and 44 when the conveyor beams 36 and 38 are in the horizontal position so that the bales will rest upon the platform portions 52, 54 and 56 and will not be in engagement with the teeth on the conveyor chains so that the bales on the beams 36 and 38, rearwardly of the bale being shredded, can be moved either forwardly or rearwardly on the conveyor chains. As seen in the drawings, platform portions 52 and 54 define a space 58 therebetween which receives the forward end of the beam 36 while platform portions 54 and 56 define a space 60 therebetween which receives the forward end of the conveyor beam 38. Preferably, guide rollers 62 are provided on the inner rearward ends of platform portions 52 and 56 for engagement with the beams 36 and 38 respectively to aid in aligning the beams with the spaces between the platform portions.

The numeral 64 refers generally to an assembly which is pivotally mounted at the forward end of the frame means which is designed to move an individual bale laterally into a pair of shredding rollers 66 and 68 as will be described in greater detail hereinafter. Assembly 64 generally comprises a pair of upright posts 70 and 72 which are pivotally secured at their lower ends, about a horizontal axis, to frame member 16. A pair of hydraulic cylinders 74 and 76 are pivotally connected at their base end to the frame means and at their rod end to the posts 70 and 72 to cause the posts 70 and 72 to pivot from the vertical position to the outwardly inclined position. Brace 78 is secured to and extends between the upper ends of the posts 70 and 72. Channel members 80 and 82 are secured to the upper ends of posts 70 and 72 and extend laterally in a spaced condition across the wheeled frame means 12. The channel members 80 and 82 are provided with end portions 84 and 86 respectively which extend upwardly and laterally from the ends of the channel members 80 and 82. Brace 88 is secured to and extends between the upper ends of the end portions 84 and 86.

Figure 5:
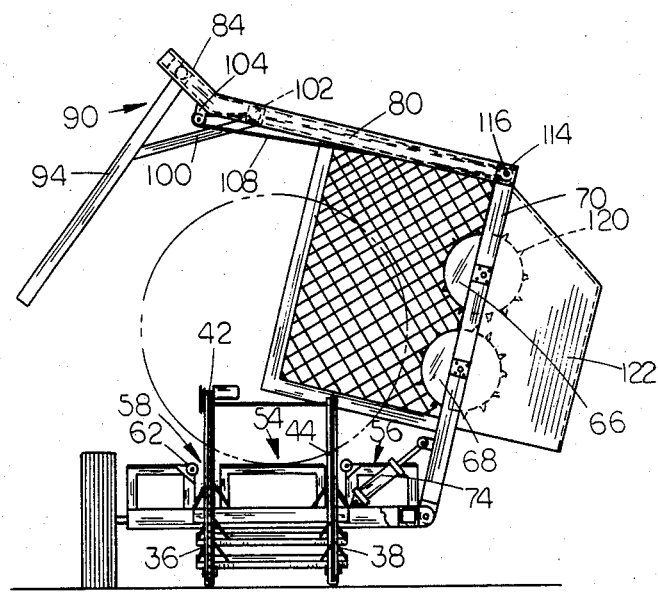
FIG. 5 is a rear view of the apparatus with the bale shredding assembly pivotally moved laterally with respect to the bale.
Figure 6:
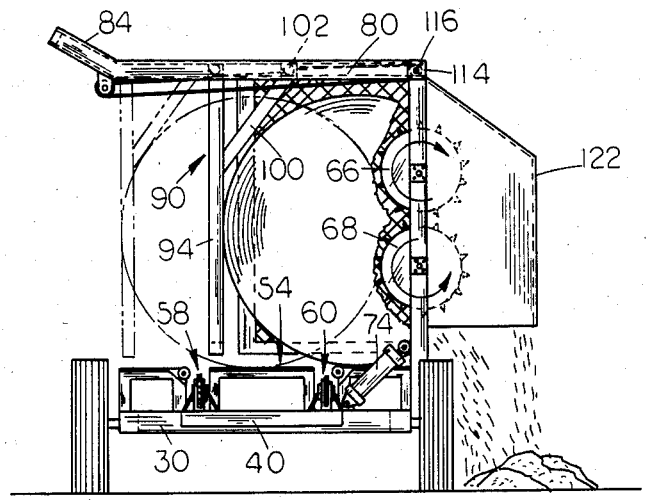
FIG. 6 is a rear view illustrating a bale being shredded by the bale shredding apparatus.

A bale pusher assembly 90 is movably mounted on the channel members 80 and 82 and generally comprises frame member 92 having a plurality of spaced-apart arms 94 secured thereto and extending downwardly therefrom. Rollers 96 and 98 are provided at the opposite ends of the frame member 92 which are received in the channel members 80 and 82 respectively. Arms 94 are provided with arm portions 100 which are secured thereto and which extend upwardly and laterally therefrom to a frame member 101. The outer ends of frame member 101 are provided with rollers 102 mounted thereon which are also received in the channel members 80 and 82. Sprockets 104 and 106 are rotatably mounted adjacent the lower ends of arm portions 84 and 86 and have chains 108 and 110 extending therearound. One end of the chain 108 is secured to one end of frame member 101. The other end of chain 108 extends around sprocket 112 which is operatively rotatably mounted adjacent the upper end of post 70. Chain 108 extends around sprocket 112 and is secured to frame member 101. Likewise, one end of chain 110 is secured to the other end of frame member 101 and extends around sprocket 106. Chain 110 also extends around sprocket 114 which is operatively rotatable around sprocket 114 and is also secured to the end of frame member 101. Sprockets 112 and 114 are mounted on shaft 116 extending therebetween. Reversible hydraulic motor 118 is operatively connected to the shaft 116 so that the sprockets 112 and 114 may be rotated in either a clockwise or counterclockwise direction. As viewed in Figure 3 rotation of sprocket 112 in a clockwise direction will cause the frame member 92 and the arms 94 depending therefrom to move towards the shredding rollers to force the bale into the rollers. Conversely, rotation of the sprockets 112 and 114 in a counterclockwise manner will cause the frame member 92 to move away from the shredding rollers. It can be seen from the drawings that the arm members 94 normally remain in a vertical condition as they travel the length of the horizontal portions of the channel members 80 and 82. However, when the rollers 96 and 98 move upwardly and outwardly in the end portions 84 and 86, the arm members 94 pivotally move outwardly to the position illustrated in FIG. 5 to provide the necessary clearance to enable a bale to be moved into position laterally of the shredding rollers as will be described in greater detail.

Shredding rollers 66 and 68 have their opposite ends rotatably mounted on posts 70 and 72 respectively and are positioned so that a predetermined amount of space is provided between the lower end of the roller 66 and the upper end of the roller 68. Likewise, roller 68 is positioned so that its lower end is spaced a predetermined distance above the upper portion of the platform portions 52, 54 and 56. A suitable hydraulic motor is operatively connected to the rollers 66 and 68 to cause the rotation of the same. The hydraulic motor is operatively connected to the roller 66 so that roller 66 is rotated in a clockwise manner as viewed from the rearward end thereof. The hydraulic motor is operatively connected to the roller 68 so that roller 68 is normally rotated in a counterclockwise direction when viewed from the rearward end thereof. However, the hydraulic motor which is connected to the rollers 66 and 68 is preferably of the reversible type so that the rollers may be reversed should "slug" or plugging occur. It is preferred that the exterior surfaces of the rollers 66 and 68 be continuous and that they have a plurality of teeth 120 extending outwardly therefrom.

The numeral 122 refers to a housing or shroud which encloses the discharge side of the rollers 66 and 68 and which has an open lower end so that hay being torn from the bale will be discharged through the lower open end of the housing 122 laterally of the wheeled frame means.

We claim:
1. A cylindrical bale shredding device comprising,
   a wheeled frame means having rearward and forward ends and opposite sides,
   a bale conveyor means pivotally mounted on said wheeled frame means and having rearward and forward ends,
   means for pivotally moving said conveyor means between a substantially horizontally disposed position to an inclined position wherein the rearward end of said conveyor means is positioned adjacent the ground for facilitating the loading of cylindrical bales on said conveyor means whereby the ends of said bales are arranged in a fore and aft relationship,
   means for operating said conveyor means for conveying a plurality of bales from the rearward end of said conveyor towards the forward end thereof,
   a bale shredding apparatus at the forward end of said wheeled frame means at one side thereof,
   and a bale pushing assembly operatively mounted on said wheeled frame means for pushing the forward- most bale on said conveyor means laterally into said bale shredding apparatus whereby the side of the bale will be moved into engagement with said bale shredding apparatus, said bale shredding apparatus comprising an upstanding support means secured to one side of said wheeled means and having upper and lower ends, said bale shredding apparatus including a bale shredding drum means rotatably mounted, about a horizontal axis, on said upstanding support means, the longitudinal axis of said drum means being parallel to the longitudinal axis of said wheeled frame means, said bale pushing assembly being mounted on the upper end of said support means and comprising a second frame means secured to the upper end of said support means and extending laterally therefrom over the forward end of said conveyor means, a push arm selectively movably mounted on said second frame means and extending downwardly thereform, for engagement with the side of a bale, and means for moving said push arm on said second frame means whereby the side of the bale will be pushed and forced into the rotating bale shredding drum means.

2. The device of claim 1 wherein said support means is pivotally secured to said frame means to permit the support means and drum means to be moved outwardly from said frame means to permit a bale on the conveyor means to be positioned for shredding.

3. The device of claim 2 wherein said frame means comprises a pair of spaced apart elongated frame members secured at one end to said support means, said frame members being substantially horizontally disposed and having upwardly and outwardly extending outer end portions, said push arm being mounted on said frame members so that the lower end thereof will move outwardly from the frame means when said push arm is traveling on said upwardly and outwardly extending portions of said frame members.

4. The device of claim 1 wherein a bale support platform means is provided on said frame means adjacent said bale shredding apparatus, said platform means having an upper bale supporting surface which is disposed above the forward end of said conveyor means when said conveyor means is in its said horizontally disposed position whereby said conveyor means may be operated without effecting the bale on said bale support platform.

* * * * *